3,333,645
MULTIPLE PURPOSE DRAWBAR
Elmer A. Gustafson, Rte. 1, Box 20,
Madrid, Iowa 50156
Filed Dec. 23, 1964, Ser. No. 420,618
3 Claims. (Cl. 172—456)

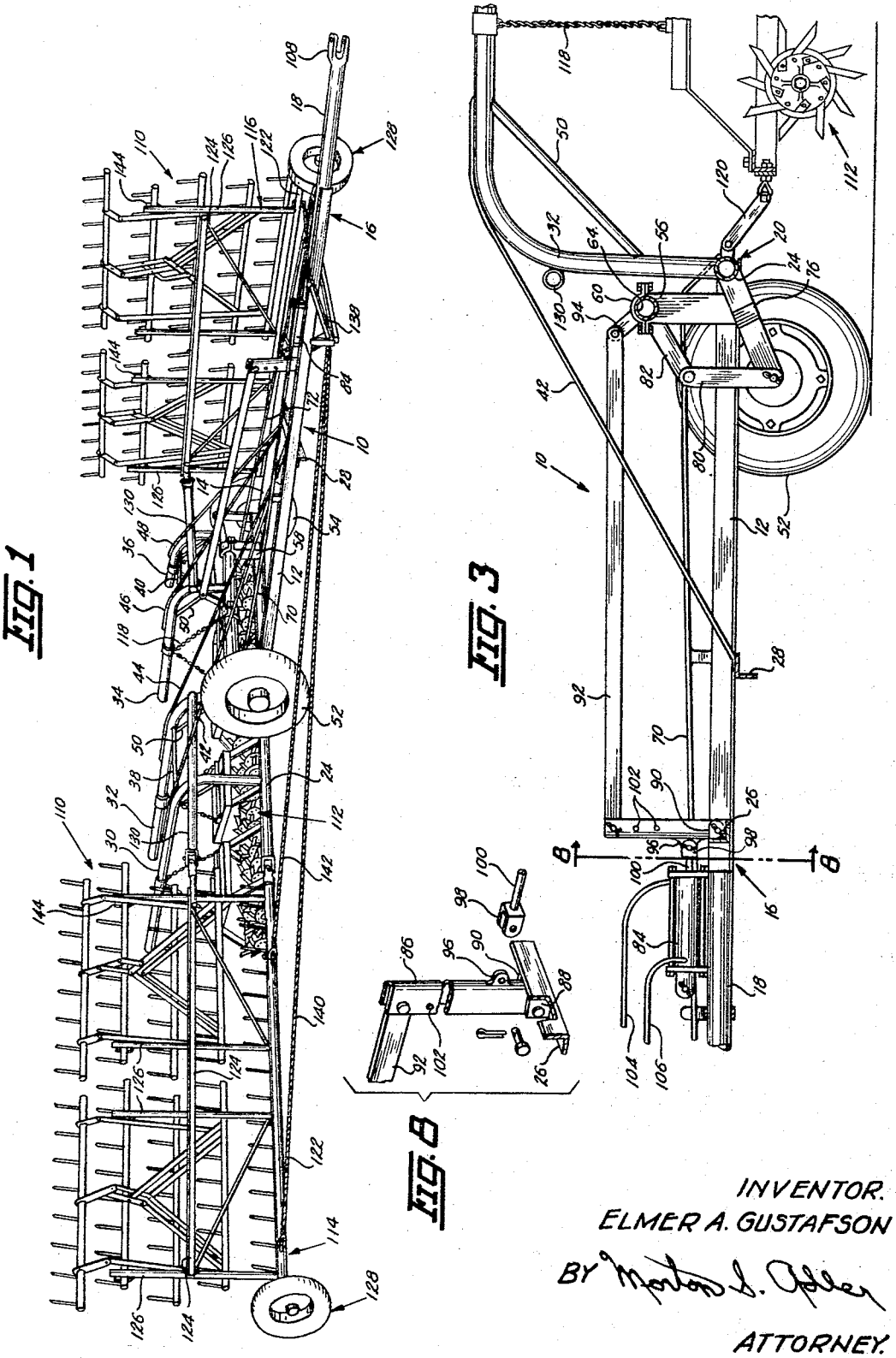

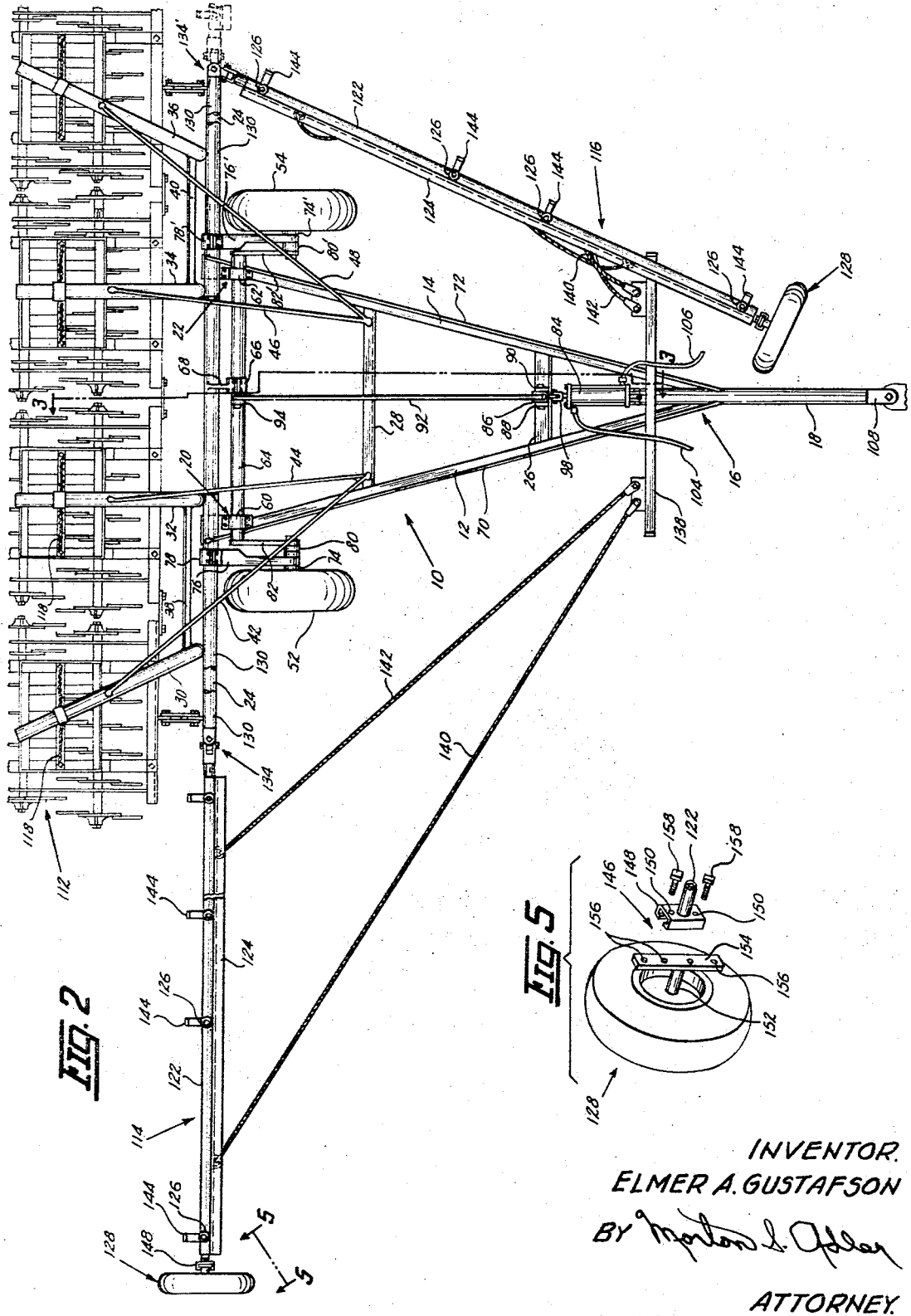

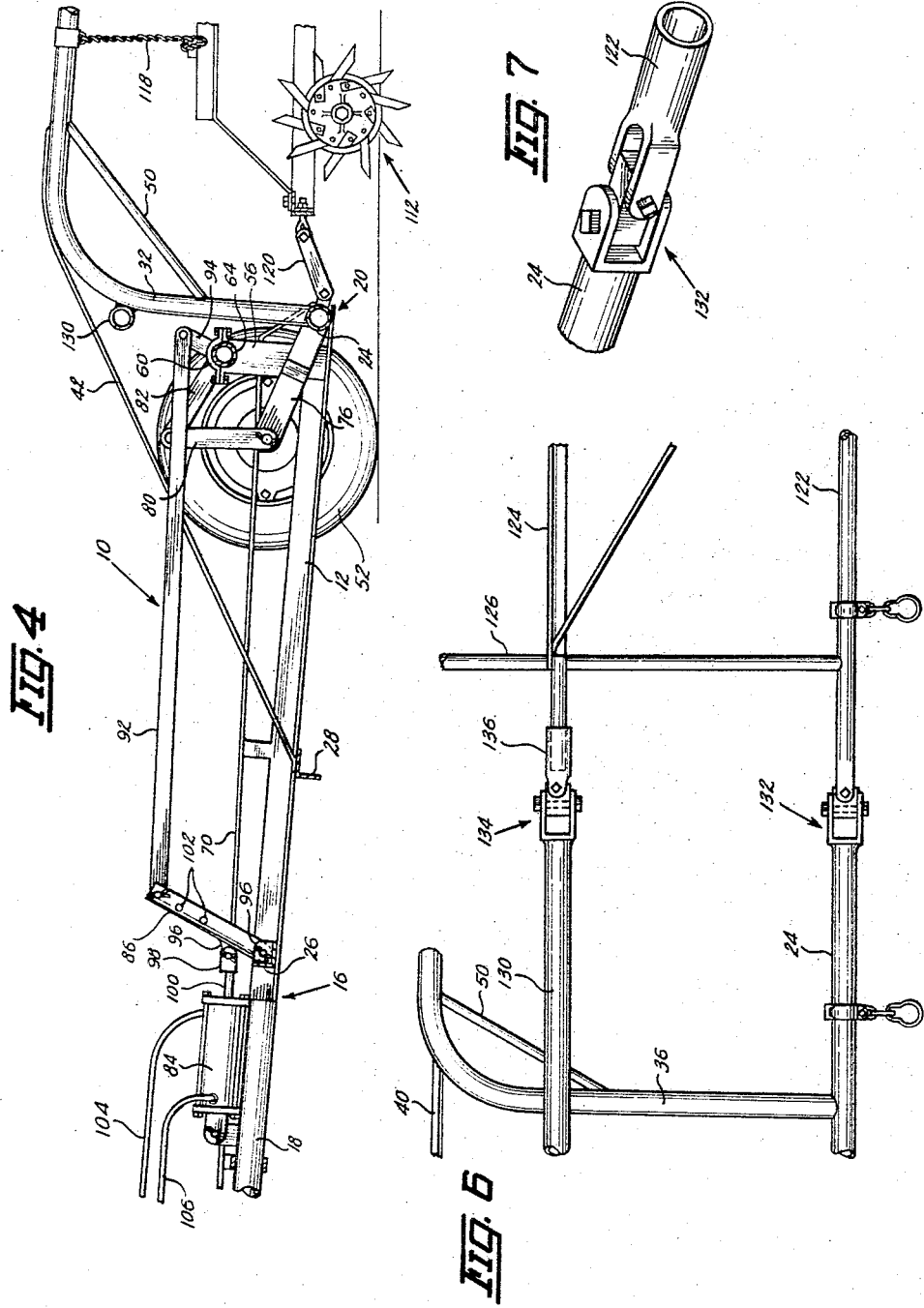

This invention relates to tilling equipment and more particularly to an improved and novel trailer mounted drawbar for use with various tillage tools such as weeders, rotary hoes, quack diggers, spring tooth harrows and the like.

One of the important objects contemplated by this invention is the provision of a trailer mounted drawbar wherein the drawbar is movable by mechanical power so it can be selectively lowered to ground level and thereby apply a downward pressure to any tilling tool attached thereto so that such tool will perform at maximum capacity at all times.

Another object herein is the provision of an adjustable drawbar of the above class which can be selectively elevated to raise tilling tools, if necessary, to avoid too great a penetration in soft soils; to eliminate trash; and to facilitate the removal of such tools from wet or boggy spots with a minimum of damage to crops.

A further object is to provide a drawbar assembly as characterized which permits a six section harrow, for example to be quickly and easily folded and supported in a position where it will negotiate an average farm gate and in which it can be readily transported with safety and stability.

Still another object is to provide a drawbar of the above class in which the vertical adjustments indicated are effected by simple controls easily accessible to the operator's seat on a tractor to which the trailer will be attached.

Another object contemplated herein is the provision of a novel adjustable wheel assembly for the wing unit of a harrow section to be attached to this new drawbar.

To attain these objects and such further objects as may appear herein, or be hereinafter pointed out, reference is made to the accompanying drawings forming a part hereof, in which:

FIG. 1 is a perspective view of my new trailer mounted drawbar showing wing units of two harrow sections each with one unit in a folded position for transporting and also showing a rotary hoe attached to the drawbar intermediate the harrow sections, FIG. 2 is a top plan view of the device shown in FIG. 1, FIG. 3 is a side view taken from the line 3—3 of FIG. 2 showing the trailer frame and drawbar in an elevated position substantially horizontal to ground level, FIG. 4 is a view similar to FIG. 3 but showing the trailer with the drawbar in a lowered position.

FIG. 5 is an enlarged exploded perspective view of the wheel adjustment assembly for the outer end of a harrow wing unit taken from the line 5—5 of FIG. 2, FIG. 6 is an enlarged fragmentary elevational view showing the connection of a harrow wing unit to certain of the supporting structure associated with the drawbar assembly, FIG. 7 is an enlarged perspective view of the universal coupling shown in FIG. 6, and FIG. 8 is an enlarged exploded perspective view of certain operating mechanism for the drawbar as seen from the line 8—8 of FIG. 3.

Referring to the drawings, this new trailer is designated generally by the numeral 10 and includes frame members 12 and 14 which define an A frame type construction in which the forward or apex end 16 is secured to a tongue 18 and the rearward spaced ends 20 and 22 are secured as by welding or the like to the underside of a transversely arranged drawbar 24 as best seen in FIGS. 3 and 4. The drawbar 24 is considerably longer than the distance between frame ends 20 and 22 and extends approximately equidistant from each such end as shown in FIG. 2. Frame members 12 and 14 are braced with the longitudinally spaced crossbars 26 and 28.

Drawbar 24 carries a plurality of spaced support members 30, 32, 34 and 36 which are preferably made from pipe material bent into an L shape so that they can be secured at one end to the drawbar 24 to extend therefrom first upwardly and then rearwardly as best seen in FIGS. 3 and 4. The two inside support members 32 and 34 (FIG. 2) extend rearwardly perpendicularly to drawbar 24 and the two outer support members 30 and 36 each extend rearwardly at a slight angle from the drawbar 24 in respective directions away from the longitudinal center point of such drawbar. It will thus be seen that supports 30 and 32 are at one side of the center of drawbar 24 and supports 34 and 36 are at the other side of such center. Such supports are for the purpose of supporting certain tilling tools as will later appear, and to add rigidity to these supports, members 30 and 32 are connected by the brace rod 38, and members 34 and 36 are similarly connected by the brace rod 40. In addition, support member 30 is connected by a brace rod 42 to the crossbar 28 on the trailer frame as best seen in FIG. 2 and the respective supports 32, 34 and 36 are similarly connected by the respective brace rods 44, 46 and 48. Further bracing for the support members is provided by the diagonal brace 50 which connects the horizontal and vertical arms of each such support as seen in FIGS. 3 and 4.

Trailer 10 is supported at its rear end on a pair of tired wheels 52 and 54 that have individual axles that cooperate in the means for raising and lowering drawbar 24 which I will now describe with reference more particularly to FIGS. 1–4. On the respective frame members 12 and 14 and at the respective rear ends 20 and 24 just forwardly of the drawbar 24 there is mounted the respective upstanding posts 56 and 58. The top of each post 56 and 58 includes the respective bearing means 60 and 62 for rotatably receiving the shaft 64 which is parallel to the drawbar 24 and which extends outwardly from the vertical plane of the posts 56 and 58. Shaft 64 is also rotatably journalled in a bearing member 66 disposed intermediate bearings 60 and 62 and secured to drawbar 24 by a rigid support 68 (FIG. 2). Additional bracing between trailer 10 and drawbar 24 from that already described is provided by means of the brace rod 70 that extends from the tongue 18 near the forward end of frame member 12 (FIG. 2) to the drawbar 24 and passes adjacent the outer side of post 56 (FIGS. 3 and 4) to which it is attached as by welding. A like rod 72 is similarly arranged relative to frame member 14 and post 58.

Shaft 64 is designed to be rotated in two respective opposite directions about its longitudinal axis and this is accomplished in the following manner. In this regard, certain linkage connection between each wheel 52 and 54 and trailer 10 is the same so this portion of the description will be directed only to wheel 52 with like parts on wheel 54 carrying like numerals primed. Wheel 52 is mounted on an individual stub axle 74 (FIG. 2) to which there is pivotally attached one end of a lever 76, with the other end of such lever being similarly attached to a bearing 78 on the drawbar 24. A rigid link 80 is pivotally connected at one end to axle 74 and similarly connected at the other end to one end of the rigid lever 82 as best seen in FIG. 3. The other end of lever 82 is rigidly connected to the projecting free end of shaft 64 (FIG. 2) for rotation therewith and it will thus be appreciated that rotation of shaft 64 will act on the linkage means 76, 80 and 82 to rotate one end of lever 76 on bearing 78 and to rotate one end of lever 82 with such shaft 64 to raise or lower trailer 10 and drawbar 24 as illustrated in FIGS. 3 and 4 in such a manner that the direction of movement of drawbar 24 is, for all practical purposes, in a vertical plane. By this arrangement, downward movement of drawbar 24 can be used to apply a holddown pressure on any implements attached to such drawbar for more effective and efficient operation where such pressure is required and an upward movement of the drawbar 24 can be made where circumstances require, such as in wet terrain.

The selective rotation of shaft 64 in two respective directions is accomplished by a two way acting hydraulic jack 84 that is mounted on tongue 18 at the apex or forward end portion 16 of trailer 10 and which is associated with shaft 64 as follows. An elongated rigid link member 86, preferably formed so as to be U-shaped in cross section as seen in FIG. 8, is pivotally secured at one end between a pair of spaced ears 88 and 90 secured to cross bar 26. Link 86 is generally in an upright position with an elongated connecting bar 92 pivotally connected at one end to the top thereof as shown in FIG. 8. The other end of bar 92 extends towards shaft 64 and is pivotally connected to one end of lever 94 which, at its other end, is secured to shaft 64. The closed side of link 86 is provided with an apertured ear 96 to which is pivotally attached a clevis 98 on the free end of the plunger rod 100 of jack 84. The upper portion of link 86 is provided with vertically spaced holes 102 for selective points of attachment for bar 92. Jack 84 includes the two hydraulic lines 104 and 106 for attachment to a source of hydraulic power such as on a tractor or the like and the extension and retraction of plunger rod 100 will correspondingly move lever 94 to rotate shaft 64 in order to raise and lower trailer 10 and drawbar 24 as indicated above.

It will of course be understood that trailer 10 will be attached to and pulled by a suitable prime mover such as a tractor (not shown) and for this purpose, tongue 18 has the usual clevis 108 for connection to the tractor hitch. With the raising and lowering of drawbar 24, it can be appreciated that there are many advantages in improving the efficiency and general use of tilling tools attached to such drawbar. To illustrte these advantages and certain novel features associated therewith, I have shown the use of trailer 10 with harrow sections, designated generally by the numeral 110 and a rotatable hoe, designated generally by the numeral 112. Also I have shown the use of the wheeled wing units 114 and 116 for utilizing additional harrow sections 110 as will be referred to in more detail. No invention per se is claimed in either the harrow sections or hoe.

As seen in FIG. 1, a plurality of hoe sections 112 can be suspended from support members 30, 32, 34 and 36 as by the chain connection 118 (FIG. 3) and attached to drawbar 24 by the movable link 120 in a well known manner and, alternately, harrow sections 110 may be similarly disposed relative to support members 30, 32, 34 and 36. Hoes 112 can be reversed for direction of rotation depending upon the desirability for a tamping or hoeing action as is well known. With either the harrows 110 or hoes 112 in place as described, the lowering of drawbar 24 under hydraulic power will exert a downward pressure on such attachments so that they will perform at maximum capacity. In the case of soft soils or wet fields, the raising of drawbar 24 will avoid too great a penetration of the harrow or hoe and facilitate their operation and removal with a minimum of damage, if any, to the crops. This entire operation of the drawbar 24 can be effected by the placement of a suitable valve control (not shown) for jack 84 within easy reach of the operator on the tractor to which trailer 10 will be attached.

The wing units 114 and 116 provide a means for adding additional harrow sections 110 if desired. Each wing unit comprises a frame having the vertically spaced horizontal members 122 and 124 and the laterally spaced vertical members 126. The outer end of frame member 122 on wing units 114 and 116 carries a wheel 128, which will later be referred to in more detail, and the inner ends of each wing unit are attached to the trailer 10 as follows. A support rod or tubular member 130 is secured to the supports 34 and 36 in spaced parallel relationship above drawbar 20 so that the outer end of member 130 is planar with the corresponding end of drawbar 24 and the spacing between members 130 and 24 corresponds to the spacing between members 122 and 124 on the wing unit 116. A similar arrangement is provided for supports 30 and 32 and wing unit 114 and like parts are given like numerals. It will thus be seen that frame member 122 on the wing units 114 and 116 is in longitudinal alignment with the drawbar 24 and as best seen in FIGS. 6 and 7, the respective adjacent ends of wing member 122 and drawbar 24 are made with complementary fittings to define the universal joint 132. The connection between adjacent ends of trailer members 130 and wing unit members 124 is also by means of a universal joint construction 134 but in this regard, a portion of the joint defines a sleeve 136 into which the end of member 124 is slidably received (FIG. 6) and thus permits a telescopic action as the wings move over uneven ground. Wing units 114 and 116 are foldable on joints 132 and 134 toward tongue 18 where they can be secured on a suitable support bar 138 secured to the trailer frame as best seen in FIG. 2 for purposes of over-the-road travel.

Cables 140 and 142 are secured to the respective wing units and to support 138 (FIG. 2) which keep them aligned with the drawbar 24 when in operating position and hook members 144, suitably spaced on members 124 of the wing units, provide a means on which to hang the harrow sections for purpose of transporting as seen in FIG. 1.

With reference now to FIG. 5, there is illustrated an improved adjustable assembly 146 for the wing unit wheels 128. Assembly 146 includes a vertically disposed channel shaped sleeve or guide 148 secured to the outer end of the lower wing unit frame member 122 and is provided with vertically spaced holes 150 as shown. Wheel 128 is mounted to a stub axle 152 that terminates in the transversely arranged bar 154 having a cross section shape complementary to the channel portion of guide 148. Bar 154 has the spaced threaded holes 156 and is designed for slidable arrangement within guide 148 where it can be secured thereto by means of a cap screw 158 inserted into any one of holes 150 in guide 148 and any selected hole 156 in bar 154. By this arrangement it will be appreciated that the height of the wing units at their wheeled end can be easily and quickly adjusted as desired.

The entire operation of folding the wing units as described can be accomplished in approximately three minutes whereby the overall width of this unit in folded position permits easy clearance of any average farm gate. Experience has demonstrated that this trailer is extremely sturdy in construction and efficient in operation and can be moved at any desired speed with safety and stability and accordingly, from the foregoing it is thought that a full understanding of the construction and operation of this invention will be had and the advantages of the same appreciated.

It will be understood that the phraseology employed herein is for the purpose of description and not for limitation and that modification and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:
1. A trailer mounted drawbar assembly comprising:
an elongated frame having a forward and rear end, a tongue on said forward end for hitchable connection to a tractor or the like,
a drawbar secured to said rear end so as to extend transversely of the longitudinal axis of said frame,
means on said drawbar for carrying a selective arrangement of tilling tools,
a wheel at each side of said frame at said rear end, each wheel mounted on a separate stub axle respectively,
a pair of upstanding spaced supports an said rear end,
a shaft journalled in said supports for rotation about its longitudinal axis,
a respective first rigid lever connected at one end to each respective end of said shaft for rotation therewith,
a respective rigid link pivotally connected at one end to each respective stub axle and pivotally connected at its other end to the respective other ends of said first levers,
a respective second lever pivotally connected at one end to said respective stub axles and similarly connected at its other end to said drawbar, and
a tilling tool disposed rearwardly of said drawbar,
a link member pivotally connected at respective ends to said drawbar and said tilling tool, and
power means on said frame for selectively rotating said shaft in two opposite directions whereby said rear end and said drawbar can be selectively vertically raised and lowered respectively above and below the plane of said axles whereby the lowering of said drawbar will exert a downward pressure on said tilling tool and the raising of said drawbar will move said tilling tool upwardly.

2. A trailer mounted drawbar assembly comprising:
an elongated frame having a forward and rear end,
a tongue on said forward end for hitchable connection to a tractor or the like,
a drawbar secured to said rear end so as to extend transversely of the longitudinal axis of said frame,
a rotatable shaft on said frame in spaced relationship above said drawbar,
a wheel at each side of said frame at said rear end,
each wheel mounted on a separate stub axle respectively,
a respective rigid link pivotally connected at respective ends to each stub axle and said drawbar,
linkage means pivotally connected to each stub axle and fixedly connected to said shaft,
power means on said frame for acting on said linkage means and rigid lever to selectively raise and lower said rear end and said drawbar in a vertical plane relative to ground level,
a harrow pulling frame-like wing unit pivotally attached at one end to one end of said drawbar,
a vertically disposed guide sleeve carried at the other end of said wing unit,
a stub axle,
a wheel mounted on one end of said stub axle,
a vertically disposed bar member carried on the other end of said stub axle,
said bar being slidably journalled in said sleeve, and
means to secure said bar to said sleeve against slidable movement relative thereto at selective positions for adjusting the height of said stub axle relative to ground level.

3. A trailer mounted drawbar assembly comprising:
an elongated frame having a forward and rear end,
a tongue on said forward end for hitchable connection to a tractor or the like,
a drawbar secured to said rear end so as to extend transversely of the longitudinal axis of said frame,
a rotatable shaft on said frame in spaced relationship above said drawbar,
a wheel at each side of said frame at said rear end,
each wheel mounted on a separate stub axle respectively,
a respectively rigid link pivotally connected at respective ends to each stub axle and said drawbar,
linkage means pivotally conencted to each stub axle and fixedly connected to said shaft,
a tilling tool disposed rearwardly of said drawbar,
a link member pivotally connected at respective ends to said drawbar and said tilling tool, and
power means on said frame for acting on said linkage means and rigid lever to selectively raise and lower said rear end and said drawbar in a vertical plane respectively above and below the plane of said axles whereby the lowering of said drawbar will exert a downward pressure on said tilling tool and the raising of said drawbar will move said tilling tool upwardly.

References Cited

UNITED STATES PATENTS

| | | | |
|---|---|---|---|
| 805,217 | 11/1905 | Matthews | 172—415 |
| 2,464,615 | 3/1949 | Sawall | 172—421 X |
| 2,538,093 | 1/1951 | Goode | 172—413 X |
| 2,754,647 | 7/1956 | Bennett et al. | 172—413 |
| 2,828,680 | 4/1958 | Johnson | 172—316 X |
| 2,889,890 | 6/1959 | Bronleewe | 172—413 |
| 2,958,383 | 11/1960 | Danielson | 172—456 |

FOREIGN PATENTS 165,740   10/1955   Australia.

ABRAHAM G. STONE, *Primary Examiner.*

J. R. OAKS, *Assistant Examiner.*